United States Patent
Chen et al.

(10) Patent No.: US 9,826,494 B2
(45) Date of Patent: Nov. 21, 2017

(54) METHOD AND APPARATUS FOR TRANSMITTING D2D SIGNALS

(71) Applicant: China Academy of Telecommunications Technology, Beijing (CN)

(72) Inventors: Wenhong Chen, Beijing (CN); Qiubin Gao, Beijing (CN); Ying Peng, Beijing (CN); Rui Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/031,116

(22) PCT Filed: Oct. 28, 2014

(86) PCT No.: PCT/CN2014/089684
§ 371 (c)(1),
(2) Date: Apr. 21, 2016

(87) PCT Pub. No.: WO2015/062475
PCT Pub. Date: May 7, 2015

(65) Prior Publication Data
US 2016/0270012 A1 Sep. 15, 2016

(30) Foreign Application Priority Data
Nov. 1, 2013 (CN) .......................... 2013 1 0535147

(51) Int. Cl.
*H04W 56/00* (2009.01)
*H04W 76/02* (2009.01)
(Continued)

(52) U.S. Cl.
CPC ............ *H04W 56/003* (2013.01); *H04B 7/26* (2013.01); *H04W 56/002* (2013.01);
(Continued)

(58) Field of Classification Search
None
See application file for complete search history.

(56) References Cited

U.S. PATENT DOCUMENTS

2014/0269641 A1* 9/2014 Jang .................. H04L 5/0053
370/336

FOREIGN PATENT DOCUMENTS

| CN | 102547871 | 7/2012 |
|---|---|---|
| CN | 103298113 | 9/2013 |

(Continued)

OTHER PUBLICATIONS

3GPP TSG RAN WG1 Meeting #74bis, "Discussion on physical channel types for D2D communication," R1-134112, Guangzhou, China, Oct. 7-11, 2013.

(Continued)

*Primary Examiner* — Sulaiman Nooristany
(74) *Attorney, Agent, or Firm* — Foley & Lardner LLP

(57) ABSTRACT

Disclosed are a method and an apparatus for transmitting D2D signals, wherein the method comprises: detecting a synchronization signal and/or a D2D signal, and determining a synchronization reference for sending or receiving other D2D signals based on the synchronization signal and/or the D2D signal; based on information carried in the detected synchronization signal and/or the D2D signal, determining a D2D resource configuration; and based on the determined synchronization reference for sending or receiving the other D2D signals and the determined D2D resource configuration, determining a resource position used for transmitting D2D signals, and sending or receiving the other D2D signals in the resource position. By enabling a UE to learn the D2D resource configuration based on the synchronization signal and/or the D2D signal, the present application prevents the UE from always using fixed resources (Continued)

when transmitting D2D signals, thus reducing mutual interference and improving transmission efficiency and quality.

18 Claims, 4 Drawing Sheets

(51) Int. Cl.
    *H04B 7/26* (2006.01)
    *H04W 72/04* (2009.01)

(52) U.S. Cl.
    CPC ....... *H04W 56/0035* (2013.01); *H04W 72/04* (2013.01); *H04W 76/02* (2013.01)

(56) References Cited

FOREIGN PATENT DOCUMENTS

| WO | WO-2010/049801 | 5/2010 |
| WO | WO-2010/082084 | 7/2010 |
| WO | WO-2013-066126 | 5/2013 |
| WO | WO-2013/066126 | 5/2013 |

OTHER PUBLICATIONS

3GPP TSG RAN WG1 Meeting #74bis, "Resource Allocation and Interference Coordination in D2D Communications," R1-134412, Guangzhou, China, Oct. 7-11, 2013.
International Search Report for PCT/CN2014/089684 dated Feb. 2, 2015.
Written Opinion for PCT/CN2014/089684 dated Feb. 2, 2015.
LG Electronics, "Scheduling and Resource Management of D2D Communications," 3GPP TSG RAN WGI Meeting #74bis, RI-134413, Guangzhou, China, Oct. 7-11, 2013.
LG Electronics, "Resource Allocation and Interference Coordination in D2D Communications," 3GPP TSG RAN WGI Meeting #74bis, RI-134412, Guangzhou, China, Oct. 7-11, 2013.
"Discussion on D2D communication" 3GPP TSG-RAN WG2 Meeting#83bis, Oct. 7-11, 2013, pp. 1-3, Institute for Information Industry (III), Ljubljana, Slovenia.
"Discussion on synchronization options for D2D operation" 3GPP TSG RAN WG1 Meeting #74, Aug. 19-23, 2013,pp. 1-4,Intel Corporation,Barcelona, Spain.
"RRM for D2D communication", 3GPP TSG-RAN1 #74bis, Oct. 7-11, 2013,pp. 1-6, Fujitsu, Guangzhou, China.

\* cited by examiner

METHOD AND APPARATUS FOR TRANSMITTING D2D SIGNALS

This application is a US National Stage of International Application No. PCT/CN2014/089684, filed on Oct. 28, 2014, designating the United States and claiming the priority to Chinese Patent Application No. 201310535147.6, filed with the State Intellectual Property Office of People's Republic of China on Nov. 1, 2013 and entitled "Method and apparatus for transmitting a D2D signal", the content of which is hereby incorporated by reference in its entirety.

FIELD

The present invention relates to the field of communications and particularly to a method and apparatus for transmitting a D2D signal.

BACKGROUND

FIG. 1 illustrates a data communication mode between two UEs in traditional cellular communication technologies. As illustrated in FIG. 1, voice, data, and other traffic of the two UEs are exchanged through evolved Node B's (eNBs) where the respective UEs reside, and a core network (an SGW/PGW).

A communication mode enabled in Device to Device (D2D) communication technologies is different from the communication mode illustrated in FIG. 1. As illustrated in FIG. 2, adjacent UEs can transmit data over a direct link in a short distance range by means of D2D without the data being forwarded through a central node (i.e., a base station). The D2D technology has the following advantages due to its short-distance communication characteristic and the direct communication mode:

(1) The UEs can communicate directly over a short distance to thereby achieve a higher data rate, a shorter delay, and lower power consumption;

(2) Spectrum resources can be utilized efficiently by the UEs widely distributed in the network due to the short distance characteristic of the D2D communication link;

(3) The direct communication mode of D2D can be adapted to a demand of e.g., wireless Peer to Peer (P2P) and other services, for sharing local data so as to provide a flexibly adaptive data service; and (4) The large number of UEs widely distributed in the network can be utilized in direct communication of D2D to extent a coverage area of the network.

The LTE D2D technology refers to D2D discovery and communication procedures, controlled by an LTE network, operating in a Long Term Evolution (LTE) licensed frequency band. The LTE D2D technology can make full use of the original advantages of the D2D) technology, and some problems of the traditional D2D technology, e.g., uncontrollable interference, etc., can be overcome by the controlling LTE network. The introduction of the LTE D2D characteristic enables the LTE technology to evolve from the pure wireless mobile cellular communication technology toward the Universal Connectivity Technology (UCT).

The LTE D2D technology includes two aspects of a D2D discovery and D2D communication, where the D2D discovery refers to that a D2D User Equipment (UE) discovers another D2D UE nearby, and the D2D communication refers to that the D2D UE communicates data with the other D2D UE. A D2D signal can be sent or received in either of the discovery and the communication only if the UEs are synchronized to each other. In the coverage area of the network, synchronization reference (or referred to as a timing reference) can be provided by the base station, and all the UEs in the coverage area are provided with the synchronization reference according to a synchronization signal sent by the base station. Outside the coverage area of the network, a synchronization signal may be sent by a cluster head responsible for the synchronizing function provided by the base station so that the other UEs in a cluster can obtain the same synchronization reference according to the synchronization signal.

FIG. 3 to FIG. 5 illustrate three D2D transmission scenarios, where FIG. 3 illustrates a D2D transmission mode in a scenario of being covered by a network, FIG. 4 illustrates a D2D) transmission mode in a scenario of being not covered by a network, and FIG. 5 illustrates a D2D transmission mode in a scenario of being partially covered by a network. As can be apparent from FIG. 3 to FIG. 5, the D2D UE in any one of the scenarios may receive D2D signals sent by UEs from a plurality of cells or a plurality of clusters, so the respective D2D signals may be received according to D2D) transmission timings and D2D) resource configurations of the cells or the clusters where these UEs are located. Before this, the UE needs to firstly obtain synchronization references and D2D resource configuration information corresponding to the D2D signals of the different cells or clusters, where the resource configuration information of the serving cells or the clusters where the UEs are located can be indicated by base stations or cluster heads.

The D2D resource configuration information of the present cell is typically signaled by the base station, but there has been absent so far a method for enabling the UE to obtain the D2D resource configuration information of the other cells or the other clusters. Thus, for example, if the UE is not covered by the network, and the cluster head is incapable of allocating a resource, then the cluster cannot allocate or signal any resource, and only a fixed resource may be applicable to the UE, so that the same D2D resources may be used among the clusters, thus easily resulting in mutual interference.

There has been absent so far a working solution to the problem in the prior art of degrading the efficiency and quality of transmission by the UE of a D2D signal over a fixed resource.

SUMMARY

In order to address the problem in the prior art of degrading the efficiency and quality of transmission by the UE of a D2D signal over a fixed resource, the invention proposes a method and apparatus for transmitting a D2D signal so that the UE can know a D2D resource configuration according to a synchronization signal and/or a D2D signal to thereby avoid the fixed resource from being applied, so as to lower mutual interference.

Technical solutions of the invention are embodied as follows:

An embodiment of the invention provides a method for transmitting a D2D signal, the method including: detecting a synchronization signal and/or a D2D signal, and determining a synchronization reference for sending or receiving other D2D signal according to the synchronization signal and/or the D2D signal; determining a D2D resource configuration according to information carried in the detected synchronization signal and/or D2D signal; and determining a resource position for D2D signal transmission, according to the determined synchronization reference for sending or receiving the other D2D signal, and the determined D2D resource configuration, and sending or receiving the other D2D signal at the resource position.

Where the synchronization reference includes at least one of:

a timing synchronization reference, a frequency synchronization reference.

Moreover determining the synchronization reference for sending or receiving the other D2D signal includes at least one of:

obtaining a sub-frame start position according to a discovery sequence in the D2D discovery signal, or a communication synchronization sequence in the D2D communication signal;

obtaining a frequency offset estimation according to a discovery sequence in the D2D discovery signal, or a communication synchronization sequence in the D2D communication signal;

obtaining a sub-frame number and/or a radio frame number according to information carried in a discovery message in the D2D discovery signal, or a communication message in the D2D communication signal;

obtaining a sub-frame start position and a sub-frame number according to a synchronization sequence in the synchronization signal;

obtaining a frequency offset estimation according to a synchronization sequence in the synchronization signal;

obtaining a radio frame number according to information carried over a synchronization channel in the synchronization signal.

Moreover determining the D2D resource configuration includes:

determining the D2D resource configuration according to the information carried in the synchronization signal and/or the D2D signal, and a pre-obtained correspondence relationship between the information and the D2D resource configuration; or determining a physical resource for D2D transmission according to the information carried in the synchronization signal, and determining the D2D resource configuration according to the physical resource; or determining the D2D resource configuration directly according to D2D resource configuration information included in the detected D2D signal.

Where the information carried in the synchronization signal includes at least one of: a sequence identifier for generating a synchronization sequence in the synchronization signal, a sequence type for the synchronization sequence, a cyclic shift for the synchronization sequence. TDD uplink-downlink configuration information carried in the synchronization signal, system bandwidth information carried in the synchronization signal.

Moreover the information carried in the D2D discovery signal is carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal.

Where the information carried in the discovery sequence or the communication synchronization sequence includes at least one of: a sequence identifier for generating the discovery sequence or the communication synchronization sequence, a sequence type for the discovery sequence or the communication synchronization sequence, a cyclic shift for the discovery sequence or the communication synchronization sequence, and other information.

Moreover the information carried in the discovery message or the communication message includes at least one of:

a D2D ID of a UE, a cell ID of a cell where the UE is located, a cluster ID of a cluster where the UE is located, a D2D application ID, D2D resource configuration indication information, a sequence identifier for generating a DMRS sequence of the discovery message or the communication message; wherein the D2D resource configuration indication information includes at least one of: D2D discovery resource configuration indication information, D2D communication resource configuration indication information.

In an aspect, the correspondence relationship is pre-obtained from a base station or a cluster head UE, or obtained through a predefined method.

Moreover if the correspondence relationship is pre-obtained from the base station or the cluster head UE, then the correspondence relationship includes at least one of:

a correspondence relationship between the information carried in a synchronization signal and/or a D2D signal of the present cell, and the D2D resource configuration;

a correspondence relationship between information carried in a synchronization signal and/or a D2D signal of other cell, and the D2D resource configuration;

a correspondence relationship between the e information carried in a synchronization signal and/or a D2D signal of the present cluster head, and the D2D resource configuration;

a correspondence relationship between information carried in a synchronization signal and/or a D2D signal of other cluster head, and the D2D resource configuration.

In another aspect, the D2D resource configuration can be determined directly according to D2D resource configuration information included in a discovery message in the detected D2D discovery signal or a communication message in the detected D2D communication signal.

Moreover sending or receiving the D2D signal at the resource position includes:

determining the resource position for sending and/or receiving the D2D signal, according to the synchronization reference determined based upon the synchronization signal, and the D2D resource configuration determined according to the information carried in the synchronization signal, and sending or receiving the D2D signal at the resource position; or determining the resource position for sending and/or receiving the D2D signal, according to the synchronization reference determined based upon the discovery sequence in the D2D discovery signal, and the D2D resource configuration determined according to the information carried in the D2D discovery signal, and sending or receiving the D2D signal; or determining the resource position for sending and/or receiving the D2D signal, according to the synchronization reference determined based upon the communication synchronization sequence in the D2D communication signal, and the D2D resource configuration determined according to the information carried in the D2D communication signal, and sending or receiving the D2D signal; or determining the resource position for sending and/or receiving the D2D signal, according to the synchronization reference determined based upon the synchronization signal, and the D2D resource configuration determined according to the information carried in the D2D discovery signal and/or the information carried in the D2D communication signal, and sending or receiving the D2D signal or determining the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and sending or receiving the D2D signal; or determining the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and sending or receiving the D2D signal.

Where determining the D2D resource configuration includes:

determining a D2D resource configuration of a UE sending the synchronization signal and/or the D2D signal; or determining a global D2D resource configuration.

Moreover the D2D signal includes at least one of: a D2D discovery signal, a D2D communication signal.

Moreover the D2D resource configuration includes at least one of: a D2D discovery resource configuration, a D2D communication resource configuration.

Optionally the D2D resource configuration includes at least one of: a physical resource configuration, a physical resource unit, the number of transmissions in a periodicity, the probability at which the D2D signal is sent, information about a sequence used by the D2D signal, scrambling information for the D2D signal, the length of a CP of the D2D signal.

In another aspect of the invention, there is provided an apparatus for transmitting a D2D signal.

The apparatus for transmitting a D2D signal according to the invention includes: a first determining module configured to detect a synchronization signal and/or a D2D signal, and to determine a synchronization reference for sending or receiving other D2D signal according to the synchronization signal and/or the D2D signal; a second determining module configured to determine a D2D resource configuration according to information carried in the detected synchronization signal and/or D2D signal; and a transmitting module configured to determine a resource position for D2D signal transmission, according to the determined synchronization reference for sending or receiving the other D2D signal, and the determined D2D resource configuration, and to send or receive the other D2D signal at the resource position.

Where the synchronization reference includes one of a timing synchronization reference and a frequency synchronization reference.

Moreover the first determining module is configured to determine the synchronization reference for sending or receiving the other D2D signal by at least one of:

obtaining a sub-frame start position according to a discovery sequence in the D2D discovery signal, or a communication synchronization sequence in the D2D communication signal;

obtaining a frequency offset estimation according to a discovery sequence in the D2D discovery signal, or a communication synchronization sequence in the D2D communication signal;

obtaining a sub-frame number and/or a radio frame number according to information carried in a discovery message in the D2D discovery signal, or a communication message in the D2D communication signal;

obtaining a sub-frame start position and a sub-frame number according to a synchronization sequence in the synchronization signal;

obtaining a frequency offset estimation according to a synchronization sequence in the synchronization signal;

obtaining a radio frame number according to information carried over a synchronization channel in the synchronization signal.

Moreover the second determining module configured to determine the D2D resource configuration is configured to determine the D2D resource configuration according to the information carried in the synchronization signal and/or the D2D signal, and a pre-obtained correspondence relationship between the information and the D2D resource configuration; or to determine a physical resource for D2D transmission according to the information carried in the synchronization signal, and to determine the D2D resource configuration according to the physical resource; or to determine the D2D resource configuration directly according to D2D resource configuration information included in the detected D2D signal.

Where the information carried in the synchronization signal includes at least one of: a sequence identifier for generating a synchronization sequence in the synchronization signal, a sequence type for the synchronization sequence, a cyclic shift for the synchronization sequence, TDD uplink-downlink configuration information carried in the synchronization signal, system bandwidth information carried in the synchronization signal.

Moreover the information carried in the D2D discovery signal is carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal.

Moreover the information carried in the discovery sequence or the communication synchronization sequence includes at least one of: a sequence identifier for generating the discovery sequence or the communication synchronization sequence, a sequence type for the discovery sequence or the communication synchronization sequence, a cyclic shift for the discovery sequence or the communication synchronization sequence, and other information.

Moreover the information carried in the discovery message or the communication message includes at least one of: a D2D ID of a UE, a cell ID of a cell where the UE is located, a cluster ID of a cluster where the UE is located, a D2D application ID, D2D resource configuration indication information, a sequence identifier for generating a DMRS sequence of the discovery message or the communication message; wherein the D2D resource configuration indication information includes at least one of: D2D discovery resource configuration indication information, D2D communication resource configuration indication information.

In an aspect, the correspondence relationship is pre-obtained from a base station or a cluster head UE, or obtained through a predefined method.

Moreover if the correspondence relationship is pre-obtained from the base station or the cluster head UE, then the correspondence relationship includes at least one of:

a correspondence relationship between the information carried in a synchronization signal and/or a D2D signal of the present cell, and the D2D resource configuration;

a correspondence relationship between information carried in a synchronization signal and/or a D2D signal of other cell, and the D2D resource configuration;

a correspondence relationship between the information carried in a synchronization signal and/or a D2D signal of the present cluster head, and the D2D resource configuration;

a correspondence relationship between information carried in a synchronization signal and/or a D2D signal of other cluster head, and the D2D resource configuration.

In another aspect, the second determining module is configured to determine the D2D resource configuration directly according to D2D resource configuration information included in a discovery message in the detected D2D discovery signal or a communication message in the detected D2D communication signal.

Moreover the transmitting module configured to send or receive the D2D signal at the resource position is configured:

to determine the resource position for sending and/or receiving the D2D signal, according to the synchronization reference determined based upon the synchronization signal, and the D2D resource configuration determined according to the information carried in the synchronization signal, and to send or receive the D2D signal at the resource position; or to determine the resource position for sending and/or receiving the D2D signal, according to the synchronization reference determined based upon the discovery sequence in the D2D discovery signal, and the D2D resource configuration determined according to the information carried in the D2D discovery signal, and to send or receive the D2D signal; or to determine the resource position for sending and/or receiving the D2D signal, according to the synchronization reference determined based upon the communication synchronization sequence in the D2D communication signal, and the D2D resource configuration determined according to the information carried in the D2D communication signal, and to send or receive the D2D signal; or to determine the resource position for sending and/or receiving the D2D signal, according to the synchronization reference determined based upon the synchronization signal, and the D2D resource configuration determined according to the information carried in the D2D discovery signal and/or the information carried in the D2D communication signal, and to send or receive the D2D signal; or to determine the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and to send or receive the D2D signal; or to determine the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and to send or receive the D2D signal.

Moreover the second determining module is configured to determine the D2D resource configuration is configured to determine a D2D resource configuration of a UE sending the synchronization signal and/or the D2D signal; or to determine a global D2D resource configuration.

Moreover the D2D signal includes at least one of: a D2D discovery signal, a D2D communication signal.

Moreover the D2D resource configuration includes at least one of: a D2D discovery resource configuration, a D2D communication resource configuration.

Moreover the D2D resource configuration includes at least one of: a physical resource configuration, a physical resource unit, the number of transmissions in a periodicity, the probability at which the D2D signal is sent, information about a sequence used by the D2D signal, scrambling information for the D2D signal, the length of a CP of the D2D signal.

In another aspect of the invention, there is provided another apparatus for transmitting a D2D signal.

The apparatus for transmitting a D2D signal according to the invention includes: a processor configured to read program in a memory:

to detect a synchronization signal and/or a D2D signal, and to determine a synchronization reference for sending or receiving other D2D signal according to the synchronization signal and/or the D2D signal; to determine a D2D resource configuration according to information carried in the detected synchronization signal and/or D2D signal; and to determine a resource position for D2D signal transmission, according to the determined synchronization reference for sending or receiving the other D2D signal, and the determined D2D resource configuration, and to send or receive the other D2D signal at the resource position through a transceiver; and the transceiver configured to be controlled by the processor to send and receive data.

Where the synchronization reference includes one of a timing synchronization reference and a frequency synchronization reference.

Moreover the processor is configured to determine the synchronization reference for sending or receiving the other D2D signal by at least one of:

obtaining a sub-frame start position according to a discovery sequence in the D2D discovery signal, or a communication synchronization sequence in the D2D communication signal;

obtaining a frequency offset estimation according to a discovery sequence in the D2D discovery signal, or a communication synchronization sequence in the D2D communication signal;

obtaining a sub-frame number and/or a radio frame number according to information carried in a discovery message in the D2D discovery signal, or a communication message in the D2D communication signal;

obtaining a sub-frame start position and a sub-frame number according to a synchronization sequence in the synchronization signal;

obtaining a frequency offset estimation according to a synchronization sequence in the synchronization signal;

obtaining a radio frame number according to information carried over a synchronization channel in the synchronization signal.

Moreover the processor configured to determine the D2D resource configuration is configured to determine the D2D resource configuration according to the information carried in the synchronization signal and/or the D2D signal, and a pre-obtained correspondence relationship between the information and the D2D resource configuration; or to determine a physical resource for D2D transmission according to the information carried in the synchronization signal, and to determine the D2D resource configuration according to the physical resource; or to determine the D2D resource configuration directly according to D2D resource configuration information included in the detected D2D signal.

Where the information carried in the synchronization signal includes at least one of: a sequence identifier for generating a synchronization sequence in the synchronization signal, a sequence type for the synchronization sequence, a cyclic shift for the synchronization sequence, TDD uplink-downlink configuration information carried in the synchronization signal, system bandwidth information carried in the synchronization signal.

Moreover the information carried in the D2D discovery signal is carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal.

Moreover the information carried in the discovery sequence or the communication synchronization sequence includes at least one of: a sequence identifier for generating the discovery sequence or the communication synchronization sequence, a sequence type for the discovery sequence or the communication synchronization sequence, a cyclic shift for the discovery sequence or the communication synchronization sequence, and other information.

Moreover the information carried in the discovery message or the communication message includes at least one of: a D2D ID of a UE, a cell ID of a cell where the UE is located, a cluster ID of a cluster where the UE is located, a D2D application ID, D2D resource configuration indication information, a sequence identifier for generating a DMRS sequence of the discovery message or the communication message; wherein the D2D resource configuration indication information includes at least one of: D2D discovery resource configuration indication information, D2D communication resource configuration indication information.

In an aspect, the correspondence relationship is pre-obtained from a base station or a cluster head UE, or obtained through a predefined method.

Moreover if the correspondence relationship is pre-obtained from the base station or the cluster head UE, then the correspondence relationship includes at least one of:

a correspondence relationship between the information carried in a synchronization signal and/or a D2D signal of the present cell, and the D2D resource configuration;

a correspondence relationship between information carried in a synchronization signal and/or a D2D signal of other cell, and the D2D resource configuration;

a correspondence relationship between the information carried in a synchronization signal and/or a D2D signal of the present cluster head, and the D2D resource configuration;

a correspondence relationship between information carried in a synchronization signal and/or a D2D signal of other cluster head, and the D2D resource configuration.

In another aspect, the processor is configured to determine the D2D resource configuration directly according to D2D resource configuration information included in a discovery message in the detected D2D discovery signal or a communication message in the detected D2D communication signal.

Moreover the processor configured to send or the receive the D2D signal at the resource position through the transceiver is configured:

to determine the resource position for sending and/or receiving the D2D signal, according to the synchronization reference determined based upon the synchronization signal, and the D2D resource configuration determined according to the information carried in the synchronization signal, and to send or receive the D2D signal at the resource position through the transceiver; or to determine the resource position for sending and/or receiving the D2D signal, according to the synchronization reference determined based upon the discovery sequence in the D2D discovery signal, and the D2D resource configuration determined according to the information carried in the D2D discovery signal, and to send or receive the D2D signal through the transceiver; or to determine the resource position for sending and/or receiving the D2D signal, according to the synchronization reference determined based upon the communication synchronization sequence in the D2D communication signal, and the D2D resource configuration determined according to the information carried in the D2D communication signal, and to send or receive the D2D signal through the transceiver; or to determine the resource position for sending and/or receiving the D2D signal, according to the synchronization reference determined based upon the synchronization signal, and the D2D resource configuration determined according to the information carried in the D2D discovery signal and/or the information carried in the D2D communication signal and to send or receive the D2D signal through the transceiver; or to determine the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and to send or receive the D2D signal through the transceiver; or to determine the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and to send or receive the D2D signal through the transceiver.

Moreover the D2D signal includes at least one of: a D2D discovery signal, a D2D communication signal.

Moreover the D2D resource configuration includes at least one of: a D2D discovery resource configuration, a D2D communication resource configuration.

Moreover the D2D resource configuration includes at least one of: a physical resource configuration, a physical resource unit, the number of transmissions in a periodicity, the probability at which the D2D signal is sent, information about a sequence used by the D2D signal, scrambling information for the D2D signal, the length of a CP of the D2D signal.

With the invention, the UE can know the D2D resource configuration according to the synchronization signal and/or the D2D signal to thereby avoid the fixed resource from being used by the UE while transmitting the D2D signal, so as to lower mutual interference, thus improving the efficiency and quality of transmission.

DETAILED DESCRIPTION OF THE EMBODIMENTS

In order to make the objects, technical solutions and advantages more apparent, the technical solutions according to the embodiments of the invention will be described below clearly and fully with reference to the drawings in the embodiments of the invention, and apparently the embodiments as described are merely a part but not all of the embodiments of the invention. All the other embodiments which can occur to those ordinarily skilled in the art from the embodiments here of the invention without any inventive effort shall fall into the scope of the invention as claimed.

An embodiment of the invention provides a method for transmitting a D2D signal.

Figure 1:
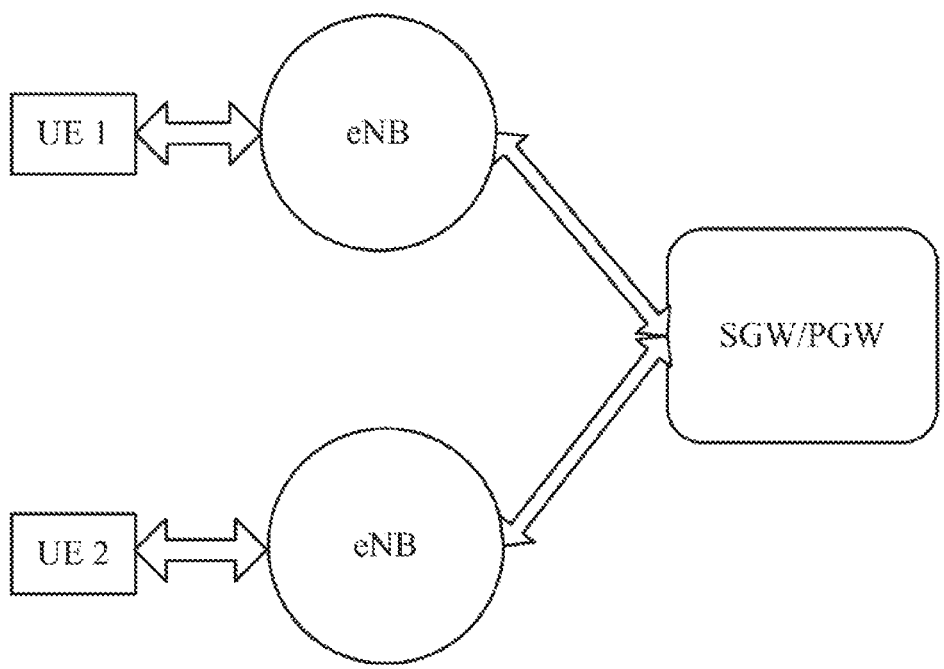
FIG. 1 is a structural diagram of a data flow of the UEs communicating in the cellular network in the prior art.
Figure 2:
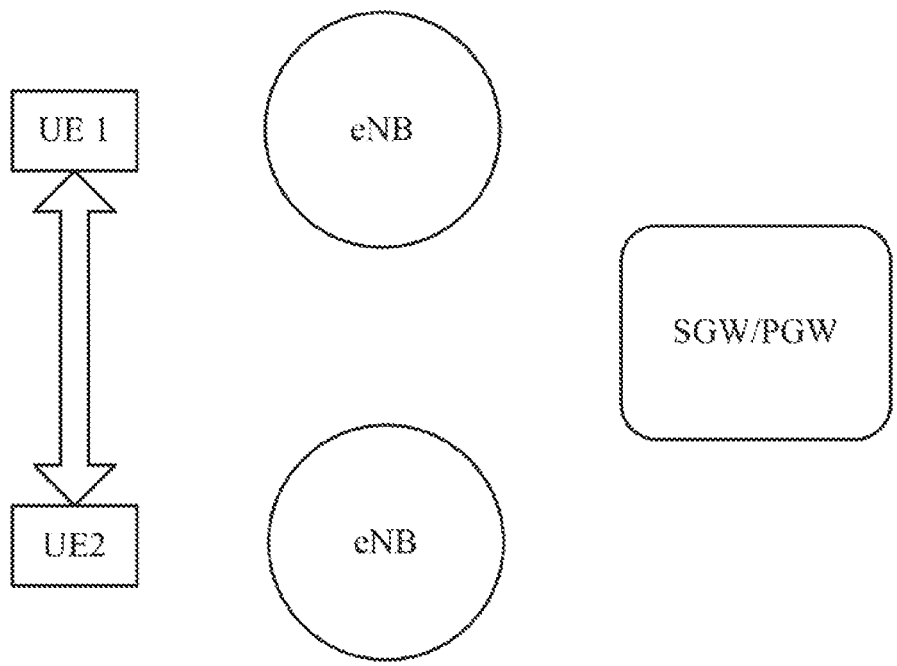
FIG. 2 is a structural diagram of a data flow of the UEs in D2D communication in the prior art.
Figure 3:
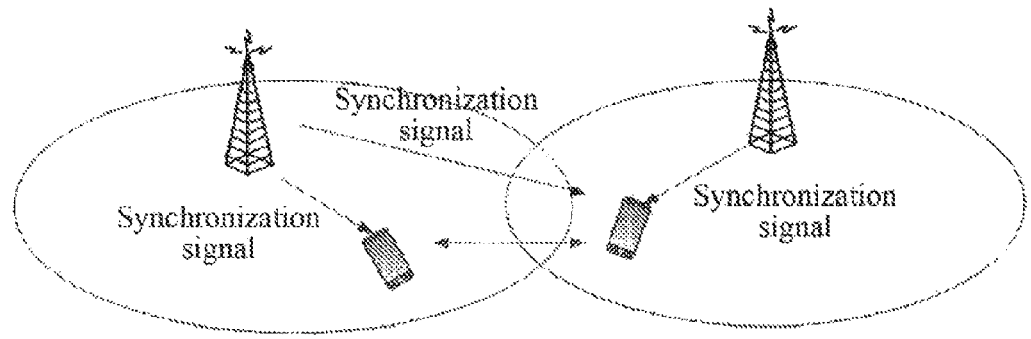
FIG. 3 is a structural diagram of the D2D transmission scenario in which the UEs are covered by a network in the prior art.
Figure 4:
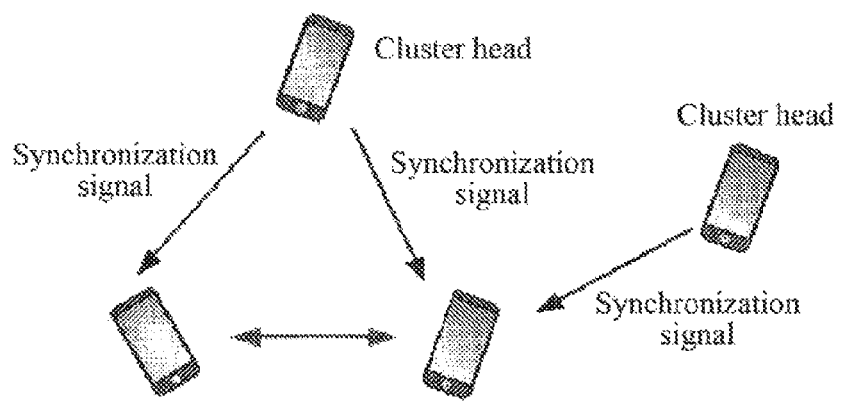
FIG. 4 is a structural diagram of the D2D transmission scenario in which the UEs are not covered by a network in the prior art.
Figure 5:
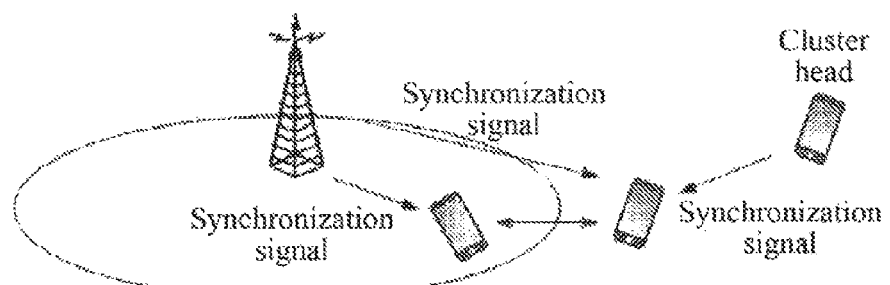
FIG. 5 is a structural diagram of the D2D transmission scenario in which the UEs are partially covered by a network in the prior art.
Figure 6:
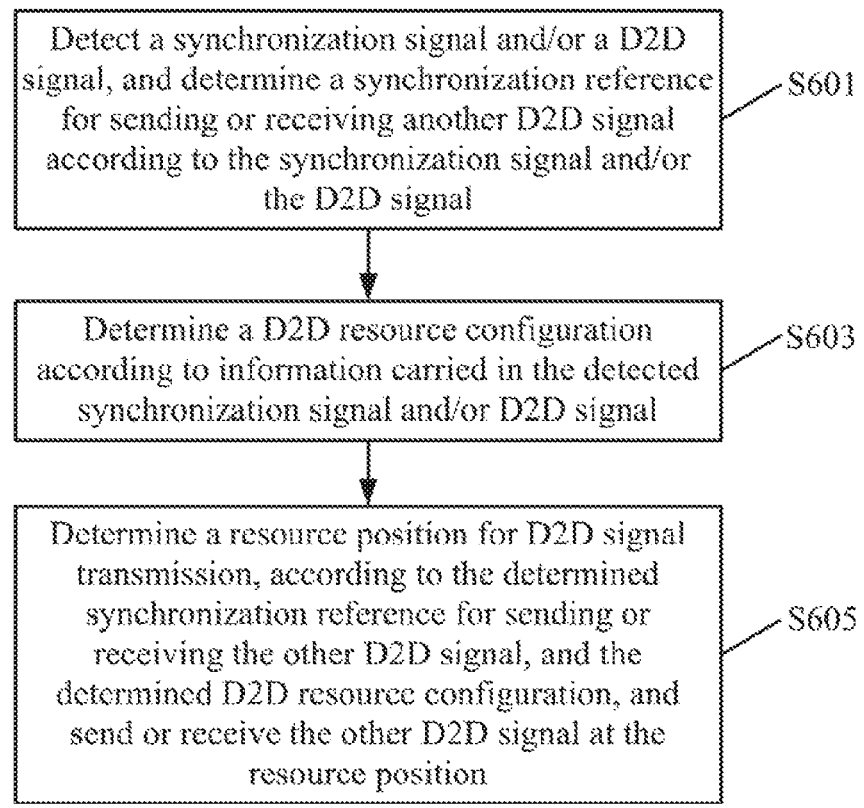
FIG. 6 is a flow chart of a method for transmitting a D2D signal according to an embodiment of the invention.

As illustrated in FIG. 6, the method for transmitting a D2D signal according to an embodiment of the invention includes:

The operation S601 is to detect a synchronization signal and/or a D2D signal, and to determine a synchronization reference (or referred to as a timing reference) for sending or receiving other D2D signal according to the synchronization signal and/or the D2D signal;

The operation S603 is to determine a D2D resource configuration according to information carried in the detected synchronization signal and/or D2D signal; and The operation S605 is to determine a resource position for D2D signal transmission, according to the determined synchronization reference for sending or receiving the other D2D signal, and the determined D2D resource configuration, and to send or receive the other D2D signal at the resource position.

Where the D2D signal can include a D2f discovery signal and/or a D2D communication signal.

It shall be noted that the synchronization signal and/or the D2D signal for determining the D2D resource configuration in the operation S603 may or may not be the same as the synchronization signal and/or the D2D signal for determining the synchronization reference in the operation S601 respectively. For example, the synchronization reference can be determined using the synchronization signal in the operation S601, and the resource configuration can be determined using the D2D signal (e.,g., the D2D communication signal or the D2D discovery signal) in the operation S603.

Moreover the other D2D signal mentioned in the operation S601 and the operation S605 different from the D2D signal above may be other D2D signal sent by a UE sending the D2D signal above, or may be a D2D signal sent by another UE, or may be a D2D signal to be sent subsequently; and the other D2D signal may be received by receiving a D2D signal of a serving cell where the UE is located, or may be a D2D signal of a non-serving cell.

Where the synchronization signal may include a synchronization sequence for obtaining a sub-frame start position and a sub-frame number, or may include a synchronization channel for obtaining a radio frame number, so that the synchronization reference can be determined based upon the synchronization signal. Moreover the synchronization reference may be determined by detecting the synchronization signal, or may be determined by detecting the D2D signal (e.g., the D2D discovery signal), or may be determined by detecting both the synchronization signal and the D2D signal. The determined synchronization reference includes a timing synchronization reference and/or a frequency synchronization reference.

Particularly the synchronization reference for sending or receiving the other D2D signal can be determined in at least one of:

A sub-frame start position is obtained according to a discovery sequence in the D2D discovery signal, or a communication synchronization sequence in the D2D communication signal;

A frequency offset estimation is obtained according to a discovery sequence in the D2D discovery signal, or a communication synchronization sequence in the D2D communication signal;

A sub-frame number and/or a radio frame number is obtained according to information carried in a discovery message in the D2D discovery signal, or a communication message in the D2D communication signal;

A sub-frame start position and a sub-frame number are obtained according to a synchronization sequence in the synchronization signal;

A frequency offset estimation is obtained according to a synchronization sequence in the synchronization signal;

A radio frame number is obtained according to information carried over a synchronization channel in the synchronization signal.

In an embodiment, the synchronization reference can be determined according to the D2D signal without determining the sub-frame number, for example, the sub-frame start position can be obtained as the synchronization reference according to the discovery sequence in the D2D discovery signal, and the D2D signal can be received without determining the sub-frame number.

A process of determining the D2D resource configuration will be described below, where the resource configuration as referred to here can include a resource configuration of the D2D discovery signal (i.e., a D2D discovery resource configuration) and/or a resource configuration of the D2D communication signal (i.e., a D2D communication resource configuration).

Moreover the D2D resource configuration can be determined by determining a D2D resource configuration of the UE sending the synchronization signal and/or the D2D signal, according to information carded in the detected synchronization signal and/or D2D signal, or determining a global D2D resource configuration according to information carried in the detected synchronization signal and/or D2D signal. That is, the determined resource configuration can be a resource configuration of the UE or a global resource configuration, where the global D2D resource configuration can be a D2D resource configuration of all the UEs in a cell, or can be a D2D resource configuration of all the cells.

Moreover the D2D resource configuration can include at least one of: a physical resource configuration (e.g., a time resource and frequency resource configuration, including a frequency hopping pattern, occupied by the D2D signal); a physical resource unit (i.e., the size of a resource occupied by a discovery resource or communication resource); the number of transmissions in a periodicity; the probability at which the D2D signal is sent; information about a sequence used by the D2D signal; scrambling information for the D2D signal; the length of a CP of the D2D signal.

The D2D resource configuration can be determined in a number of approaches, which will be described below respectively.

(First Approach) The D2D resource configuration is determined according to the information carried in the synchronization signal and/or the D2D signal, and a pre-obtained correspondence relationship between the information and the D2D resource configuration.

The information carried in the synchronization signal includes at least one of: a sequence identifier for generating a synchronization sequence in the synchronization signal (the sequence identifier can be obtained from a cell ID of the cell where the UE is located, or a cluster ID of the cluster where the UE is located), a sequence type for the synchronization sequence, a cyclic shift for the synchronization sequence, Time Division Duplex (TDD) uplink-downlink configuration information carried in the synchronization signal, system bandwidth information carried in the synchronization signal.

Moreover the information carried in the D2D discovery signal can be carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal, where optionally the information carried in the discovery sequence or the communication synchronization sequence includes at least one of: a sequence identifier for generating the discovery sequence or the communication synchronization sequence (the sequence identifier can be the cell ID of the cell where the UE is located, or the cluster ID of the cluster where the UE is located), a sequence type for the discovery sequence or the communication synchronization sequence, a cyclic shift for the discovery sequence or the communication synchronization sequence, and other information; and the information carried in the discovery message or the communication message includes at least one of: a D2D ID of the UE, the cell ID of the cell where the UE is located, the cluster ID of the cluster where the UE is located, a D2D application ID, D2D resource configuration indication information, a sequence identifier for generating a Demodulation Reference Signal (DMRS) sequence of the discovery message or the communication message; where the D2D resource configuration indication information includes at least one of: D2D discovery resource configuration indication information, D2D communication resource configuration indication information.

In the correspondence relationship above, if one of the two corresponding items is the D2D resource configuration, then the other item can include any one of: the information carried in the synchronization signal, the information carried in the discovery sequence, the information carried in the discovery message, the information carried in the communication synchronization sequence, and the information carried in the communication message, or can include a combination of more than one of the information listed above.

For example, in an embodiment, the UE determines the D2D resource configuration according to the sequence identifier determined for the sequence of the detected synchronization signal, and a predetermined correspondence relationship between the sequence identifier and the D2D resource configuration; in another embodiment, the UE determines the D2D resource configuration according to the sequence identifier determined for the discovery sequence in the detected D2D discovery signal, and a predetermined correspondence relationship between the sequence identifier and the D2D resource configuration; in still another embodiment, the UE determines the D2D discovery resource configuration according to the D2D ID included in the discovery message in the detected D2D discovery signal, and a predetermined correspondence relationship between the D2D ID and the D2D discovery resource configuration; and in a further embodiment, the UE determines the D2D resource configuration according to the D2D resource configuration indication information included in the discovery message in the detected D2D discovery signal, and a predetermined correspondence relationship between the D2D resource configuration indication information and the D2D resource configuration; and the particular embodiments listed here can also be combined with each other, and can also be combined with other embodiments which are not listed here.

Moreover the correspondence relationship above is pre-obtained from a base station or a cluster head UE, or obtained through a predefined method.

Where if the correspondence relationship is pre-obtained from the base station or the cluster head UE, then the correspondence relationship includes at least one of:

A correspondence relationship between the information carried in a synchronization signal and/or a D2D signal of the present cell, and the D2D resource configuration;

A correspondence relationship between information carried in a synchronization signal and/or a D2D signal of other cell, and the D2D resource configuration;

A correspondence relationship between the information carried in a synchronization signal and/or a D2D signal of the present cluster head, and the D2D resource configuration;

A correspondence relationship between information carried in a synchronization signal and/or a D2D signal of other cluster head, and the D2D resource configuration.

For example the base station of the present cell can obtain the correspondence relationship between the information carried in the synchronization signal and/or the D2D signal of the other cell, and the D2D resource configuration by exchanging D2D resource configuration information with the other base station, and further notify the UE; and the cluster head UE can obtain the correspondence relationship between the information carried in the synchronization signal and/or the D2D signal of the other cluster, and the D2D resource configuration by exchanging D2D resource configuration information with the other cluster head UE, and further notify the UE.

(Second Approach) The D2D resource configuration is determined directly according to D2D resource configuration information included in the detected D2D signal. The D2D signal includes a D2D discovery signal and/or a D2D communication signal, and the D2D resource configuration can be determined in this approach by determining the D2D resource configuration directly according to D2D resource configuration information included in a discovery message in the detected D2D discovery signal or a communication message in the detected D2D communication signal. For example, for the D2D discovery signal, the D2D resource configuration is carried directly in the D2D discovery signal instead of being carried in the D2D discovery signal in correspondence to some specific information, so the UE can determine the D2D resource configuration by directly reading the information carried in the D2D discovery signal without referring to the correspondence relationship in the first approach described above. For example, the UE can determine the D2D discovery resource configuration according to discovery resource configuration information included in the discovery message in the D2D discovery signal. For the D2D communication signal, the D2D resource configuration can be determined similarly.

(Third Approach) A physical resource for D2D transmission is determined according to the information carried in the synchronization signal, and the D2D resource configuration is determined according to the physical resource. The D2D resource configuration is determined in this approach by determining the physical resource available to D2D transmission according to the information carried in the synchronization signal to thereby determine the D2D resource configuration. For example, the UE determines from the TDD uplink-downlink configuration information carried in the synchronization signal that uplink sub-frames thereof are available to D2D transmission to thereby determine the D2D resource configuration. In another example, the UE determines from the system bandwidth information carried in the synchronization signal that only resource in a system bandwidth are available to D2D transmission to thereby determine the D2D resource configuration.

The information carried in the synchronization signal includes at least one of: a sequence identifier for generating a synchronization sequence in the synchronization signal (the sequence identifier can be obtained from a cell ID of the cell where the UE is located, or a cluster ID of the cluster where the UE is located), a sequence type for the synchronization sequence, a cyclic shift for the synchronization sequence, TDD uplink-downlink configuration information carried in the synchronization signal, system bandwidth information carried in the synchronization signal.

Moreover the information carried in the D2D discovery signal can be carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal, where optionally the information carried in the discovery sequence or the communication synchronization sequence includes at least one of: a sequence identifier for generating the discovery sequence or the communication synchronization sequence (the sequence identifier can be the cell ID of the cell where the UE is located, or the cluster ID of the cluster where the UE is located), a sequence type for the discovery sequence or the communication synchronization sequence, a cyclic shift for the discovery sequence or the communication synchronization sequence, and other information; and the information carried in the discovery message or the communication message includes at least one of: a D2D ID of the UE, the cell ID of the cell where the UE is located, the cluster ID of the cluster where the UE is located, a D2D application ID, D2D resource configuration indication information, a sequence identifier for generating a DMRS sequence of the discovery message or the communication message; where the D2D resource configuration indication information includes at least one of: D2D discovery resource configuration indication information, D2D communication resource configuration indication information.

After the synchronization reference and the D2D resource configuration are determined as described above, the UE can determine the resource position for D2D signal transmission, and further send or receive the D2D signal at the resource position.

In an embodiment, the UE can determine the resource position for sending and/or receiving the D2D signal, according to the synchronization reference determined based upon the synchronization signal, and the D2D resource configuration determined according to the information carried in the synchronization signal, and send or receive the D2D signal at the resource position.

In another embodiment, the UE can determine the resource position for sending and/or receiving the D2D signal, according to the synchronization reference determined based upon the discovery sequence in the D2D discovery signal, and the D2D resource configuration determined according to the information carried in the D2D discovery signal, and send or receive the D2D signal.

In another embodiment, the UE can determine the resource position for sending and/or receiving the D2D signal, according to the synchronization reference determined based upon the communication synchronization sequence in the D2D communication signal, and the D2D resource configuration determined according to the information carried in the D2D communication signal, and send or receive the D2D signal.

In another embodiment, the UE can determine the resource position for sending and/or receiving the D2D signal, according to the synchronization reference determined based upon the synchronization signal, and the D2D resource configuration determined according to the information carried in the D2D discovery signal and/or the information carried in the D2D communication signal, and send or receive the D2D signal.

In another embodiment, the UE can determine the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and send or receive the D2D signal.

In another embodiment, the UE can determine the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and send or receive the D2D signal.

The process above according to the invention can send and detect the D2D signal so that the UE can obtain timing and resource information required for reception of D2D signals of different cells or clusters, according to the synchronization signal or the D2D signal, and also can obtain timing and resource information of the present cell, or the cluster where the UE is located, using this method to thereby send D2D signals.

The technical solution according to the invention will be described below in connection with particular examples thereof:

In a first example, the UE which is a D2D UE is in the coverage area of the base station.

The base station exchanges information with an adjacent base station, obtains a cell ID and a D2D resource configuration of a cell covered by the adjacent base station, and further creates a correspondence relationship between the cell ID and the D2D resource configuration, and notifies the UE via downlink control signaling or a broadcast, where the D2D resource configuration here can be a D2D discovery resource configuration, or can be a D2D communication resource configuration. For example, we can refer to the correspondence relationship depicted in Table 1:

TABLE 1

| Cell ID | D2D resource configuration |
|---|---|
| Serving cell ID | Periodicity 1 and sub-frame configuration 1 |
| Cell ID2 | Periodicity 2 and sub-frame configuration 2 |
| Cell ID3 | Periodicity 3 and sub-frame configuration 3 |

The UE receives the downlink control signaling or the broadcast, sent by the base station, indicating the correspondence relationship between the cell ID and the D2D resource configuration;

The UE detects synchronization signals of a plurality of cells based upon different cell IDs, and determines synchronization references for receiving D2D signals of the respective cells according to downlink timings obtained from the synchronization signals of the respective cells, where the D2D signal corresponds to the D2D resource configuration, that is, if the D2D resource configuration is the D2D discovery resource configuration, then the synchronization reference will be a synchronization reference of the D2D discovery signal; and if the D2D resource configuration is the D2D communication resource configuration, then the synchronization reference will be a synchronization reference of the D2D communication signal;

The UE obtains the cell IDs of the respective cells by detecting the synchronization signals of the respective cells, where the cell ID is a sequence identifier determined by a sequence for the synchronization signal as in downlink synchronization in the LTE. Then the UE determines D2D resource configurations of the respective cells according to the pre-obtained correspondence relationship between the cell ID and the D2D resource configuration; for example, if the UE detects that the ID of some cell A, where a synchronization signal A is sent, is a cell ID2, then the UE may determine that a D2D resource configuration of the cell is the periodicity 2 and the sub-frame configuration 2; and The UE determines physical resources over which the D2D signals of the respective cells are to be received, according to the determined synchronization references for receiving the D2D signals of the respective cells, and the D2D resource configurations of the corresponding cells, and receives the D2D signals over the corresponding resources. For example, the UE determines a synchronization reference of the cell A according to the synchronization signal A, obtains a sub-frame start position and a sub-frame number of the cell A, and then receives the D2D signal of the cell A in a sub-frame corresponding to the sub-frame configuration 2 at the periodicity 2 according to the D2D resource configuration of the cell A, i.e., the cell ID2, obtained from the synchronization signal A.

In a second example, the UE which is a D2D UE is out of the coverage area of the base station.

The respective UEs prescribe a correspondence relationship between a cluster ID and a D2D resource configuration, for example, a cluster with a cluster ID of K corresponds to a D2D resource periodicity T, and an applicable D2D sub-frame index N satisfies N mod 3=K mod 3. The D2D resource here can be a resource for a D2D discovery, or can be a resource for D2D communication;

The UE detects synchronization signals of a plurality of clusters based upon different cluster IDs, and determines synchronization references for receiving D2D signals of the respective clusters according to downlink timings obtained from the synchronization signals of the respective clusters, where the D2D signal corresponds to the D2D resource configuration, that is, if the D2D resource configuration is the D2D discovery resource configuration, then the synchronization reference will be a synchronization reference of the D2D discovery signal; and if the D2D resource configuration is the D2D communication resource configuration, then the synchronization reference will be a synchronization reference of the D2D communication signal;

The UE obtains the cluster IDs of the respective clusters by detecting the synchronization signals of the respective clusters, where the cluster ID is a sequence identifier determined by a sequence for the synchronization signal as in downlink synchronization in the LTE. Then the UE determines D2D resource configurations of the respective clusters according to the pre-obtained correspondence relationship between the cluster ID and the D2D resource configuration; for example, if the UE detects that the cluster ID of some cluster A, where a synchronization signal A is sent, is k, then the UE may determine that a D2D resource configuration of the cluster is the periodicity T, and the applicable D2D sub-frame index N satisfies N mod 3=k mod 3; and The UE determines physical resources over which the D2D signals of the respective clusters are to be received, according to the determined synchronization references for receiving the D2D signals of the respective clusters, and the D2D resource configurations of the corresponding clusters, and receives the D2D signals over the corresponding resources. For example, the UE determines a synchronization reference of the cluster A according to the synchronization signal A, obtains a sub-frame start position and a sub-frame number of the cluster A, and then receives the D2D signal of the cluster A in a sub-frame corresponding to a sub-frame index satisfying N mod 3=k mod 3 at the periodicity T according to the D2D resource configuration of the cluster A, obtained from the synchronization signal A.

In a third example, the UE which is a D2D UE is in the coverage area of the base station.

The base station exchanges information with an adjacent base station, obtains a sequence ID for generating a discovery sequence by the UE in a cell covered by the adjacent base station, and a D2D discovery resource configuration of the corresponding cell, and further creates a correspondence relationship between the sequence ID and the D2D discovery resource configuration, and notifies the UE via downlink control signaling or a broadcast; For example, we can refer to the correspondence relationship depicted in Table 2 (the sequence ID can be the same as the cell ID):

TABLE 2

| Sequence ID | D2D resource configuration |
|---|---|
| Sequence ID1 | Bandwidth configuration 1, discovery periodicity 1, and discovery sub-frame configuration 1 |
| Sequence ID2 | Bandwidth configuration 2, discovery periodicity |

TABLE 2-continued

| Sequence ID | D2D resource configuration |
| --- | --- |
| Sequence ID3 | 2, and discovery sub-frame configuration 2<br>Bandwidth configuration 3, discovery periodicity 3, and discovery sub-frame configuration 3 |

The UE receives the downlink control signaling or the broadcast, sent by the base station, indicating the correspondence relationship between the sequence ID and the D2D resource configuration;

The UE detects D2D discovery signals from different UEs based upon different sequence IDs and corresponding bandwidth configurations, and determines synchronization references for receiving D2D discovery signals of the respective UEs, or other UEs in cells where the UEs are located, according to timings obtained from discovery sequences in the D2D discovery signals;

The UE obtains sequence IDs for generating the discovery sequences by the respective UEs according to the discovery sequences in the detected D2D discovery signals of the respective UE, and then determines D2D discovery resource configurations for sending the D2D discovery signals by the respective UEs, or the other UEs in the cells where the UEs are located, according to the pre-obtained correspondence relationship between the discovery sequence ID and the D2D discovery resource configuration; for example, if the UE detects that the sequence ID of a discovery sequence in some D2D discovery signal is a sequence ID1, then the UE may determine that a D2D discovery resource configuration of the UE, or the cell where the UE is located, is the bandwidth configuration 1, the discovery periodicity 1, and the discovery sub-frame configuration 1; and The UE determines physical resources over which the D2D discovery signals of the respective UEs, or the other UEs in the cells where the respective UEs are located, are to be received, according to the determined synchronization references for receiving the D2D discovery signals of the respective UEs, or the cells where the respective UEs are located, and the D2D resource configurations of the respective UEs, or the cells where the respective UEs are located, and receives the D2D discovery signals over the corresponding resources. For example, the UE determines a synchronization reference of a UE A according to a D2D discovery signal A, obtains a sub-frame start position and a sub-frame number of the UE A, and then receives the D2D discovery signal of the UE A over a bandwidth corresponding to the bandwidth configuration 1, in a sub-frame corresponding to the discovery sub-frame configuration 1 at the discovery periodicity 1 according to the D2D resource configuration of the UE A, i.e., the UE sequence ID1, obtained from the D2D discovery signal A.

Fourth Example

The UE detects D2D discovery signals from different UEs, and determines synchronization references for receiving D2D discovery signals of the respective UEs, or UEs in cells where the UEs are located, according to timings obtained from discovery sequences in the D2D discovery signals;

The UE determines D2D discovery resource configurations for sending the D2D discovery signals by the respective UEs, or the UEs in the cells where the respective UEs are located according to discovery resource configuration information carried in discovery messages in the detected D2D discovery signals of the respective UEs; for example, the discovery resource configuration information of several bits in the discovery message indicates that the D2D discovery resource configuration of the UE, or the cell where the UE is located is the bandwidth configuration 1, the discovery periodicity 1, the discovery sub-frame configuration 1, and the frequency hopping configuration 1; and The UE determines physical resources over which the D2D discovery signals of the respective UEs, or the UEs in the cells where the respective UEs are located, are to be received, according to the determined synchronization references for receiving the D2D discovery signals of the respective UEs, or the cells where the respective UEs are located, and the D2D discovery resource configurations of the respective UEs, or the cells where the respective UEs are located, and receives the D2D discovery signals over the corresponding resources. For example, the UE determines a synchronization reference of a cell where a UE A is located, according to a discovery sequence in a D2D discovery signal A, obtains a sub-frame start position and a sub-frame number of the cell, and then determines physical resources for the respective UEs in the cell where the UE A is located, in accordance with the frequency hopping configuration 1 over a bandwidth corresponding to the bandwidth configuration 1, in a sub-frame corresponding to the discovery sub-frame configuration 1 at the discovery periodicity 1 according to the D2D discovery resource configuration of the cell where the UE A is located, obtained from a discovery message in the D2D discovery signal A, and receives the D2D discovery signals sent by the UEs in the cell A.

Fifth Example

The UE detects synchronization signals from different cells and/or clusters, and determines synchronization reference for determining D2D discovery signals of the respective cells and/or clusters according to downlink timings obtained from the synchronization signals of the respective cells and/or clusters;

The UE detects the D2D discovery signals of the respective cells in a predefined resource range according to the determined synchronization references for receiving the D2D discovery signals of the respective cells and/or clusters;

The UE determines D2D discovery resource configurations for sending the D2D discovery signals by UEs in the cells and/or clusters where the respective UEs are located, according to discovery resource configuration information carried in discovery messages in the detected D2D discovery signals sent by the UEs in the cells and/or the clusters; for example, the discover resource configuration information of several bits in the discovery message indicates that the D2D discovery resource configuration of the cell and/or the cluster where the UE is located is the discovery sub-frame configuration 1 and the discovery sub-band configuration 1; and The UE determines physical resource for receiving the D2D discovery signals of the respective cells and/or clusters according to the determined synchronization references for receiving the D2D discovery signals of the respective cells and/or clusters, and the D2D discovery resource configurations of the respective cells and/or clusters, and receives the D2D discovery signals over the respective resources. For example, the UE determines a synchronization reference of a cell and/or a cluster where a UE A is located according to a synchronization signal A, obtains a sub-frame start position and a sub-frame number of the cell and/or the cluster, and then receives the D2D discovery signals sent by the UEs in the cell and/or the cluster A, in a sub-band corresponding to the sub-band configuration 1 in a sub-frame corresponding to the discovery sub-frame configuration 1 according to a D2D discovery resource configuration of the cell and/or the cluster where the UE A is located, obtained from a discovery message in a D2D discovery signal A.

In a sixth example, the UE which is a D2D UE is out of the coverage area of the base station.

The respective UEs prescribe a correspondence relationship between a cluster ID and a D2D resource configuration, for example, a cluster with a cluster ID of K corresponds to a D2D resource periodicity T, and an applicable D2D sub-frame index N satisfies N mod 4=K mod 4 (N<20). The D2D resource configuration here can be a D2D discovery resource configuration, or can be a D2D communication resource configuration;

The UE detects a synchronization signal of a cluster Where the UE is located based upon different cluster IDs, and determines a synchronization reference for sending a D2D signal according to a downlink timing obtained from the synchronization signal of the cluster where the UE is located, where the D2D signal here corresponds to the D2D resource configuration, that is, if the D2D resource configuration is the D2D discovery resource configuration, then the synchronization reference here will be a synchronization reference of the D2D discovery signal; and if the D2D resource configuration is the D2D communication resource configuration, then the synchronization reference here will be a synchronization reference of the D2D communication signal;

The UE determines a D2D resource configuration of a cluster where the UE is located, according to a cluster ID obtained while detecting the synchronization signal (the cluster ID here is a sequence identifier determined for a sequence applicable to the synchronization signal), and a pre-obtained correspondence relationship between the cluster ID and the D2D resource configuration; for example, if the UE detects that the cluster ID of the cluster where the UE is located, is k, then the UE will determine that the D2D resource configuration of the cluster is the discovery periodicity T, and the applicable D2D sub-frame index N satisfies N mod 4=k mod 4 (N<20). The D2D resource configuration here includes the same information as the D2D resource configuration in the first operation of the sixth example; and The UE determines a physical resource over which the D2D signal is to be sent, according to the determined synchronization reference for sending the D2D signal, and the D2D resource configuration of the cluster where the UE is located, and sends the D2D signal over the corresponding resource. For example, the UE determines a synchronization reference for sending the D2D signal according to a synchronization signal A of the cluster where the UE is located, obtains a sub-frame start position and a sub-frame number of the cluster where the UE is located, and then sends the D2D signal in a sub-frame corresponding to a sub-frame index satisfying N mod 4=k mod 4 (N<20) at the periodicity T according to the D2D resource configuration of the cluster where the UE is located, obtained from the synchronization signal A.

Seventh Example

The UE detects D2D communication signals from different UEs, and determines synchronization references for receiving the D2D communication signals of the respective UEs, or UEs in cells where the UEs are located, according to timings obtained from communication synchronization sequences in the D2D communication signals;

The UE determines D2D communication resource configurations for sending the D2D communication signals by the respective UEs, or the UEs in the cells Where the respective UEs are located, according to communication resource configuration information carried in communication messages in the detected D2D communication signals of the respective UEs; for example, the communication resource configuration information of several bits in the communication message indicates that the D2D communication resource configuration of the UE, or the cell where the UE is located, is the bandwidth configuration 1, the communication sub-frame configuration 1, and the communication duration 1;and The UE determines physical resources for receiving the D2D communication signals of the respective UEs, or the UEs in the cells Where the respective UEs are located, according to the determined synchronization references for receiving the D2D communication signals of the UEs, or the cells where the UEs are located, and the D2D communication resource configurations of the UEs, or the cells where the UEs are located, and receives the D2D communication signals over the corresponding resources. For example, the UE determines a synchronization reference of a cell where a UE A is located, according to a communication synchronization sequence in a D2D communication signal A, obtains a sub-frame start position and a sub-frame number of the cell and then determines physical resources for sending D2D communication signals by respective UEs in the cell where the UE A is located, in accordance with the communication duration 1 over a bandwidth corresponding to the bandwidth configuration 1, in a sub-frame corresponding to the communication sub-frame configuration 1 according to a D2D communication resource configuration of the cell where the UE A is located, obtained from a communication message in the D2D communication signal A, and receives the D2D communication signals sent by the UEs in the cell A.

An embodiment of the invention further provides an apparatus for transmitting a D2D signal.

Figure 7:
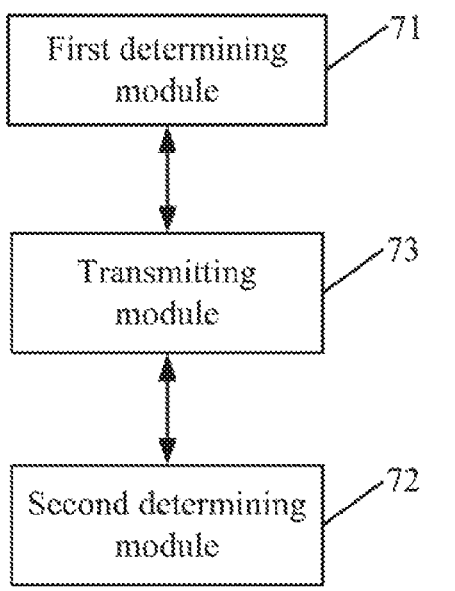
FIG. 7 is a block diagram of an apparatus for transmitting a D2D signal according to an embodiment of the invention.

As illustrated in FIG. 7, an apparatus for transmitting a D2D signal according to an embodiment of the invention includes: a first determining module 71 configured to detect a synchronization signal and/or a D2D signal, and to determine a synchronization reference for sending or receiving other D2D signal, according to the synchronization signal and/or the D2D signal; a second determining module 72 configured to determine a D2D resource configuration according to information carried in the detected synchronization signal and/or D2D signal; and a transmitting module 73 configured to determine a resource position for D2D signal transmission, according to the determined synchronization reference for sending or receiving the other D2D signal, and the determined D2D resource configuration, and to send or receive the other D2D signal at the resource position.

Where the D2D signal can include at least one of:

A D2D discovery signal, a D2D communication signal.

Moreover the synchronization reference can include one of:

A timing synchronization reference and a frequency synchronization reference.

Moreover when determining the synchronization reference, the first determining module 71 is configured to determine the synchronization reference for sending or receiving the other D2D signal by at least one of:

Obtaining a sub-frame start position according to a discovery sequence in the D2D discovery signal, or a communication synchronization sequence in the D2D communication signal;

Obtaining a frequency offset estimation according to a discovery sequence in the D2D discovery signal, or a communication synchronization sequence in the D2D communication signal;

Obtaining a sub-frame number and/or a radio frame number according to information carried in a discovery message in the D2D discovery signal, or a communication message in the D2D communication signal;

Obtaining a sub-frame start position and a sub-frame number according to a synchronization sequence in the synchronization signal;

Obtaining a frequency offset estimation according to a synchronization sequence in the synchronization signal;

Obtaining a radio frame number according to information carried over a synchronization channel in the synchronization signal.

In an aspect, the second determining module 72 configured to determine the D2D resource configuration is configured to determine the D2D resource configuration according to the information carried in the synchronization signal and/or the D2D signal, and a pre-obtained correspondence relationship between the information and the D2D resource configuration.

Where the information carried in the synchronization signal includes at least one of: a sequence identifier for generating a synchronization sequence in the synchronization signal, a sequence type for the synchronization sequence, a cyclic shift for the synchronization sequence, TDD uplink-downlink configuration information carried in the synchronization signal, system bandwidth information carried in the synchronization signal.

Moreover the information carried in the D2D discovery signal is carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal. Moreover the information carried in the discovery sequence or the communication synchronization sequence includes at least one of a sequence identifier for generating the discovery sequence or the communication synchronization sequence, a sequence type for the discovery sequence or the communication synchronization sequence, a cyclic shift for the discovery sequence or the communication synchronization sequence, and other information.

Where the information carried in the discovery message or the communication message includes at least one of a D2D ID of a UE, a cell ID of a cell where the UE is located, a cluster ID of a cluster where the UE is located, a D2D application ID, D2D resource configuration indication information, a sequence identifier for generating a DMRS sequence of the discovery message or the communication message; where the D2D resource configuration indication information includes at least one of D2D discovery resource configuration indication information, D2D communication resource configuration indication information.

Moreover the correspondence relationship is pre-obtained from a base station or a cluster head UE, or obtained through a predefined apparatus.

Moreover if the correspondence relationship is pre-obtained from the base station or the cluster head UE, then the correspondence relationship includes at least one of:

A correspondence relationship between the information carried in a synchronization signal and/or a D2D signal of the present cell, and the D2D resource configuration;

A correspondence relationship between information carried in a synchronization signal and/or a D2D signal of other cell, and the D2D resource configuration;

A correspondence relationship between the information carried in a synchronization signal and/or a D2D signal of the present cluster head, and the D2D resource configuration;

A correspondence relationship between information carried in a synchronization signal and/or a D2D signal of other cluster head, and the D2D resource configuration.

In another aspect, instead of determining the D2D resource configuration according to the correspondence relationship, the second determining module 72 configured to determine the D2D resource configuration is configured to determine the D2D resource configuration directly according to D2D resource configuration information included in the detected D2D signal.

Where the D2D signal includes a D2D discovery signal and/or a D2D communication signal, and the second determining module 72 configured to determine the D2D resource configuration is configured to determine the D2D resource configuration directly according to D2D resource configuration information included in a discovery message in the detected D2D discovery signal or a communication message in the detected D2D communication signal.

In a further aspect, instead of determining the D2D resource configuration in the two approaches above, the second determining module 72 configured to determine the D2D resource configuration is configured to determine a physical resource for D2D transmission according to the information carried in the synchronization signal, and to determine the D2D resource configuration according to the physical resource.

Where the information carried in the synchronization signal includes at least one of: a sequence identifier for generating a synchronization sequence in the synchronization signal, a sequence type for the synchronization sequence, a cyclic shift for the synchronization sequence, TDD uplink-downlink configuration information carried in the synchronization signal, system bandwidth information carried in the synchronization signal.

Moreover the information carried in the D2D discovery signal is carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal. Moreover the information carried in the discovery sequence or the communication synchronization sequence includes at least one of: a sequence identifier for generating the discovery sequence or the communication synchronization sequence, a sequence type for the discovery sequence or the communication synchronization sequence, a cyclic shift for the discovery sequence or the communication synchronization sequence, and other information.

Where the information carried in the discovery message or the communication message includes at least one of: a D2D ID of a UE, a cell ID of a cell where the UE is located, a cluster ID of a cluster where the UE is located, a D2D application ID. D2D resource configuration indication information, a sequence identifier for generating a DMRS sequence of the discovery message or the communication message; where the D2D resource configuration indication information includes at least one of: D2D discovery resource configuration indication information. D2D communication resource configuration indication information.

Moreover the transmitting module 73 configured to send or the receive the D2D signal at the resource position is configured:

To determine the resource position for sending and/or receiving the D2D signal, according to the synchronization reference determined based upon the synchronization signal, and the D2D resource configuration determined according to the information carried in the synchronization signal, and to send or receive the D2D signal at the resource position; or To determine the resource position for sending and/or receiving the D2D signal, according to the synchronization reference determined based upon the discovery sequence in the D2D discovery signal, and the D2D resource configuration determined according to the information carried in the D2D discovery signal, and to send or receive the D2D signal; or To determine the resource position for sending and/or receiving the D2D signal, according to the synchronization reference determined based upon the communication synchronization sequence in the D2D communication signal, and the D2D resource configuration determined according to the information carried in the D2D communication signal, and to send or receive the D2D signal; or To determine the resource position for sending and/or receiving the D2D signal, according to the synchronization reference determined based upon the synchronization signal, and the D2D resource configuration determined according to the information carried in the D2D discovery signal and/or the information carried in the D2D communication signal, and to send or receive the D2D signal; or To determine the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and to send or receive the D2D signal; or To determine the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and to send or receive the D2D signal.

Where the D2D resource configuration includes at least one of:

A D2D discovery resource configuration, a D2D communication resource configuration.

Moreover the second determining module 72 configured to determine the D2D resource configuration is configured to determine a D2D resource configuration of a UE sending the synchronization signal and/or the D2D signal, according to information carried in the detected synchronization signal and/or D2D signal; or To determine a global D2D resource configuration according to information carried in the detected synchronization signal and/or D2D signal.

Moreover the D2D resource configuration includes at least one of: a physical resource configuration, a physical resource unit, the number of transmissions in a periodicity, the probability at which the D2D signal is sent, information about a sequence used by the D2D signal, scrambling information for the D2D signal, the length of a CP of the D2D signal.

In summary, with the technical solutions above according to the invention, the D2D resource configuration is determined according to the information carried in the detected synchronization signal or D2D signal, and the synchronization reference is determined according to the synchronization signal or the D2D signal, to detect D2D signals, so that the UE can obtain from the synchronization signal or the D2D signal the timing and resource information required for reception of the D2D signals of different cells or clusters to thereby discover the UE served by the respective cell or cluster; a UE in some cluster can also know the D2D resource for the cluster from the synchronization signal without any additional signaling overhead; and the separate physical resources can be applied to the respective clusters without mutual interference between the resources to thereby improve the efficiency and quality of transmission.

The underlying principle of the invention has been described above in connection with the particular embodiments thereof, but it shall be noted that those ordinarily skilled in the art can appreciate that all or any of the operations or the components in the method and the apparatus according to the invention can be embodied in hardware, firmware, software, or their combination in any computing device (including a processor, a storage medium, etc.) or network of computing devices as can occur to those ordinarily skilled in the art upon reading the disclosure of the invention while employing their general programming skills.

Accordingly the object of the invention can also be attained by a program or a set of programs operating on any computing device, which can be a well-known general-purpose device. Thus the object of the invention can also be attained by only providing a program product including program codes in which the method or the apparatus is embodied. That is, such a program product also constitutes the invention, and a storage medium in which such a program product is stored also constitutes the invention. Apparently the storage medium can be any well-known storage medium or any storage medium to be developed later.

Another embodiment of the invention further provides a storage medium (the storage medium can be an ROM, an RAM, a hard disk, a removable memory, etc.) in which a computer program for transmitting a D2D signal is built, where the computer program includes code segments configured to perform the operations of: detecting a synchronization signal and/or a D2D signal, and determining a synchronization reference for sending or receiving other D2D signal according to the synchronization signal and/or the D2D signal; determining a D2D resource configuration according to information carried in the detected synchronization signal and/or D2D signal; and determining a resource position for D2D signal transmission, according to the determined synchronization reference for sending or receiving the other D2D signal, and the determined D2D resource configuration, and sending or receiving the other D2D signal at the resource position.

Another embodiment of the invention further provides a computer program including code segments configured to send a D2D signal in the operations of: detecting a synchronization signal and/or a D2D signal, and determining a synchronization reference for sending or receiving other D2D signal according to the synchronization signal and/or the D2D signal; determining a D2D resource configuration according to information carried in the detected synchronization signal and/or D2D signal; and determining a resource position for D2D signal transmission, according to the determined synchronization reference for sending or receiving the other D2D signal, and the determined D2D resource configuration, and sending or receiving the other D2D signal at the resource position.

If the embodiments of the invention are embodied in software and/or firmware, a program constituting the software can be installed from a storage medium or a network to a machine with a dedicated hardware structure (e.g., a general-purpose computer 800 illustrated in FIG. 8) which can perform various functions when various pieces of programs are installed thereon.

Figure 8:
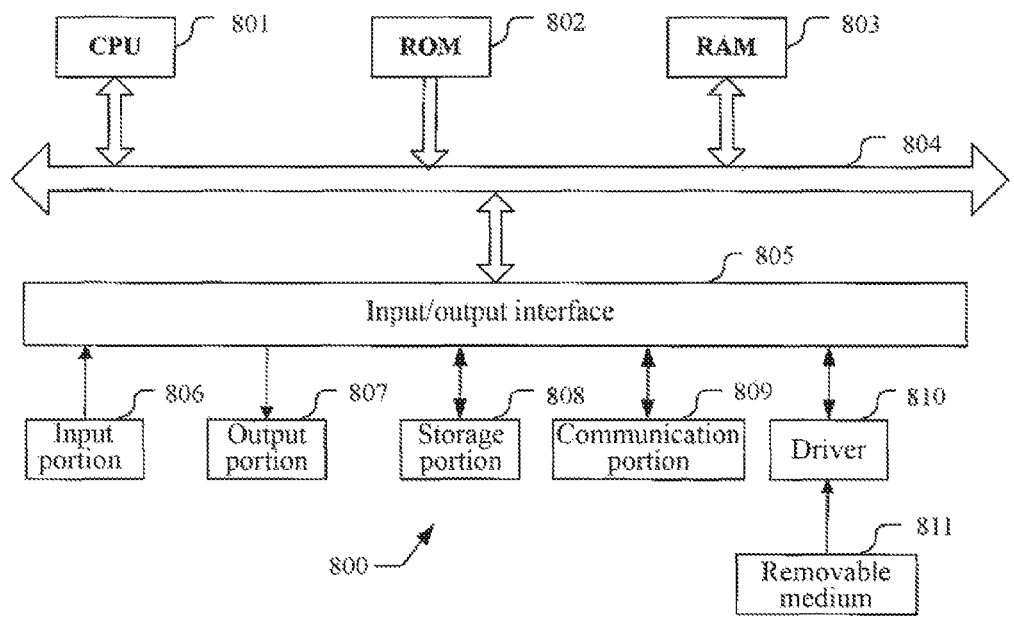
FIG. 8 is a structural block diagram of a computer in which the technical solutions according to the invention can be embodied.

In FIG. 8, a Central Processing Unit (CPU) 801 performs various processes according to program stored in a Read Only Memory (ROM) 802 or loaded from a storage portion 808 into a Random Access Memory (RAM) 803 in which data required when the CPU 801 performs the various processes is also stored as needed. The CPU 801, the ROM 802, and the RAM 803 are connected to each other via a bus 804 to which an input/output interface 805 is also connected.

The following components are connected to the input/output interface 805: an input portion 806 (including a keyboard, a mouse, etc.), an output portion 807 (including a display, e.g., a Cathode Ray Tube (CRT), a Liquid Crystal Display (LCD), etc., a speaker, etc.), a storage port 808 (including a hard disk, etc.), and a communication portion 809 (including a network interface card, e.g., an LAN card, an MODEM, etc.), The communication portion 809 performs a communication process over a network, e.g., the Internet.

A driver 810 is also connected to the input/output interface 805 as needed. A removable medium 811, e.g., a magnetic disk, an optical disk, an Optic-magnetic disk, a semiconductor memory, etc., can be installed on the driver 810 as needed so that computer program fetched therefrom can be installed into the storage portion 808 as needed.

In the case that the foregoing series of processes are performed in software, program constituting the software can be installed from a network, e.g., the Internet, etc., or a storage medium, e.g., the removable medium 811, etc.

Those skilled in the art shall appreciate that such a storage medium will not be limited to the removable medium 811 illustrated in FIG. 8 in which the program is stored and which is distributed separately from the apparatus to provide a user with the program. Examples of the removable medium 811 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 802, a hard disk included in the storage port 808, etc., in which the program is stored and which is distributed together with the apparatus including the same to the user.

Figure 9:
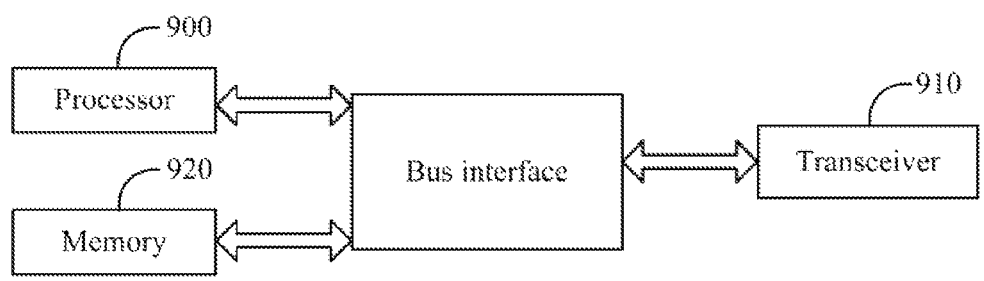
FIG. 9 is a block diagram of another apparatus for transmitting a D2D signal according to an embodiment of the invention.

The structure of and processing by the transmitting apparatus according to the embodiment of the invention will be described below in connection with a preferred hardware structure thereof. As illustrated in FIG. 9, the apparatus includes a processor 900 configured to read program stored in a memory 920, and to perform the processes of:

Detecting a synchronization signal and/or a D2D signal, and determining a synchronization reference for sending or receiving other D2D signal according to the synchronization signal and/or the D2D signal; determining a D2D resource configuration according to information carried in the detected synchronization signal and/or D2D signal; and determining a resource position for D2D signal transmission, according to the determined synchronization reference for sending or receiving the other D2D signal, and the determined D2D resource configuration, and sending or receiving the other D2D signal at the resource position through a transceiver 910; and The transceiver 910 is configured to be controlled by the processor 900 to send and receive data.

Here in FIG. 9, the bus architecture can include any number of interconnected buses and bridges which are particularly configured to link various circuits together including one or more processor represented by the processor 900, and a memory represented by a memory 920.

The bus architecture can further link various other circuits together, e.g., peripheral devices, a voltage regulator, a power management circuit, etc., all of which are well known in the art, so a repeated description thereof will be omitted in this context. The bus interface provides an interface. The transceiver 910 can include a plurality of elements including a transmitter and a receiver configured to provide elements communicating with other various apparatuses over a transmission medium. The processor 900 is responsible for managing the bus architecture and typical processes, and the memory 920 can store data used by the processor 900 in performing operations, Where the D2D signal can include at least one of:

A D2D discovery signal, a D2D communication signal.

Moreover the synchronization reference can include one of:

A timing synchronization reference and a frequency synchronization reference.

Moreover when determining the synchronization reference, the processor 900 is configured to determine the synchronization reference for sending or receiving the other D2D signal by at least one of:

Obtaining a sub-frame start position according to a discovery sequence in the D2D discovery signal, or a communication synchronization sequence in the D2D communication signal;

Obtaining a frequency offset estimation according to a discovery sequence in the D2D discovery signal, or a communication synchronization sequence in the D2D communication signal;

Obtaining a sub-frame number and/or a radio frame number according to information carried in a discovery message in the D2D discovery signal, or a communication message in the D2D communication signal;

Obtaining a sub-frame start position and a sub-frame number according to a synchronization sequence in the synchronization signal;

Obtaining a frequency offset estimation according to a synchronization sequence in the synchronization signal;

Obtaining a radio frame number according to information carried over a synchronization channel in the synchronization signal.

In an aspect, the processor 900 configured to determine the D2D resource configuration is configured to determine the D2D resource configuration according to the information carried in the synchronization signal and/or the D2D signal, and a pre-obtained correspondence relationship between the information and the D2D resource configuration.

Where the information carried in the synchronization signal includes at least one of: a sequence identifier for generating a synchronization sequence in the synchronization signal, a sequence type for the synchronization sequence, acyclic shift for the synchronization sequence, TDD uplink-downlink configuration information carried in the synchronization signal, system bandwidth information carried in the synchronization signal.

Moreover the information carried in the D2D discovery signal is carried in a discovery sequence in the D2D discovery signal and/or a discovery message in the D2D discovery signal; and the information carried in the D2D communication signal is carried in a communication synchronization sequence in the D2D communication signal and/or a communication message in the D2D communication signal. Moreover the information carried in the discovery sequence or the communication synchronization sequence includes at least one of a sequence identifier for generating the discovery sequence or the communication synchronization sequence, a sequence type for the discovery sequence or the communication synchronization sequence, a cyclic shift for the discovery sequence or the communication synchronization sequence, and other information, Where the information carried in the discovery message or the communication message includes at least one of: a D2D ID of a UE, a cell ID of a cell where the UE is located, a cluster ID of a cluster where the UE is located, a D2D application ID, D2D resource configuration indication information, a sequence identifier for generating a DMRS sequence of the discovery message or the communication message; where the D2D resource configuration indication information includes at least one of: D2D discovery resource configuration indication information, D2D communication resource configuration indication information.

Moreover the correspondence relationship is pre-obtained from a base station or a cluster head UE, or obtained through a predefined apparatus.

Moreover if the correspondence relationship is pre-obtained from the base station or the cluster head UE, then the correspondence relationship includes at least one of:

A correspondence relationship between the information carried in a synchronization signal and/or a D2D signal of the present cell, and the D2D resource configuration;

A correspondence relationship between information carded in a synchronization signal and/or a D2D signal of other cell, and the D2D resource configuration;

A correspondence relationship between the information carried in a synchronization signal and/or a D2D signal of the present cluster head, and the D2D resource configuration;

A correspondence relationship between information carried in a synchronization signal and/or a D2D signal of other cluster head, and the D2D resource configuration.

In another aspect, instead of determining the D2D resource configuration according to the correspondence relationship, the processor 900 configured to determine the D2D resource configuration is configured to determine the D2D resource configuration directly according to D2D resource configuration information included in the detected D2D.

Where the D2D signal includes a D2D discovery signal and/or a D2D communication signal, and the processor 900 configured to determine the D2D resource configuration is configured to determine the D2D resource configuration directly according to D2D resource configuration information included in a discovery message in the detected D2D discovery signal or a communication message in the detected D2D communication signal.

In a further aspect, instead of determining the D2D resource configuration in the two approaches above, the processor 900 configured to determine the D2D resource configuration is configured to determine a physical resource for D2D transmission according to the information carried in the synchronization signal, and to determine the D2D resource configuration according to the physical resource.

Where the information carried in the synchronization signal includes at least one of: a sequence identifier for generating a synchronization sequence in the synchronization signal, a sequence type for the synchronization sequence, a cyclic shift for the synchronization sequence, TDD uplink-downlink configuration information carried in the synchronization signal, system bandwidth information carried in the synchronization signal.

Moreover the information carried in the D2D discovery signal is carried in a discovery sequence in the D2D discovery signal and/or a discovery message in the D2D discovery signal: and the information carried in the D2D communication signal is carried in a communication synchronization sequence in the D2D communication signal and/or a communication message in the D2D communication signal. Moreover the information carried in the discovery sequence or the communication synchronization sequence includes at least one of: a sequence identifier for generating the discovery sequence or the communication synchronization sequence, a sequence type for the discovery sequence or the communication synchronization sequence, a cyclic shift for the discovery sequence or the communication synchronization sequence, and other information.

Where the information carried in the discovery message or the communication message includes at least one of: a D2D ID of a UE, a cell ID of a cell where the UE is located, a cluster ID of a cluster where the UE is located, a D2D application ID, D2D resource configuration indication information, a sequence identifier for generating a DMRS sequence of the discovery message or the communication message where the D2D resource configuration indication information includes at least one of: D2D discovery resource configuration indication information. D2D communication resource configuration indication information.

Moreover the processor 900 configured to send or the receive the D2D signal at the resource position through the transceiver 910 is configured:

To determine the resource position for sending and/or receiving the D2D signal, according to the synchronization reference determined based upon the synchronization signal, and the D2D resource configuration determined according to the information carried in the synchronization signal, and to send or receive the D2D signal at the resource position through the transceiver 910; or To determine the resource position for sending and/or receiving the D2D signal, according to the synchronization reference determined based upon the discovery sequence in the D2D discovery signal, and the D2D resource configuration determined according to the information carried in the D2D discovery signal, and to send or receive the D2D signal through the transceiver 910; or To determine the resource position for sending and/or receiving the D2D signal, according to the synchronization reference determined based upon the communication synchronization sequence in the D2D communication signal, and the D2D resource configuration determined according to the information carried in the D2D communication signal, and to send or receive the D2D signal through the transceiver 910; or To determine the resource position for sending and/or receiving the D2D signal, according to the synchronization reference determined based upon the synchronization signal, and the D2D resource configuration determined according to the information carried in the D2D discovery signal and/or the information carried in the D2D communication signal, and to send or receive the D2D signal through the transceiver 910; or To determine the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and to send or receive the D2D signal through the transceiver 910; or To determine the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and to send or receive the D2D signal through the transceiver 910.

Where the D2D resource configuration includes at least one of:

A D2D discovery resource configuration, a D2D communication resource configuration.

Moreover the processor 900 configured to determine the D2D resource configuration is configured to determine a D2D resource configuration of a UE sending the synchronization signal and/or the D2D signal, according to information carried in the detected synchronization signal and/or D2D signal; or To determine a global D2D resource configuration according to information carried in the detected synchronization signal and/or D2D signal.

Moreover the D2D resource configuration includes at least one of: a physical resource configuration, a physical resource unit, the number of transmissions in a periodicity, the probability at which the D2D signal is sent, information about a sequence used by the D2D signal, scrambling information for the D2D signal, the length of a CP of the D2D signal.

It shall be further noted that apparently, the respective components or the respective operations in the apparatus or the transmitting method according to the invention can be decomposed and/or recombined. These decompositions and/or recombinations shall be regarded as equivalent solutions to the invention. Moreover the operations in which the series of processes are performed can naturally be performed sequentially in the described order, but may not necessarily be performed sequentially in order. Some of the operations may be performed concurrently or separately from each other.

Although the invention and the advantages thereof have been described in details, it shall be appreciated that various modifications, substitutions and changes can be made without departing from the spirit and scope of the invention as defined in the appended claims. Moreover the terms "include", "comprise", and any other variants thereof in the invention are intended to encompass non-excluding inclusion so that a process, a method, an article or a device including a series of elements include both those elements and other elements which have not been listed explicitly or elements inherent to the process, the method, the article or the device. Unless further defined, an element(s) defined in a sentence "including a/an . . . " will not preclude the presence of additional identical elements in a process, a method, an article or a device including the element(s).

The invention claimed is:

1. A method for transmitting a D2D signal, the method comprising:

detecting a synchronization signal and/or a D2D signal, and determining a synchronization reference for sending or receiving other D2D signal according to the synchronization signal and/or the D2D signal;

determining a D2D resource configuration according to information carried in the detected synchronization signal and/or D2D signal; and determining a resource position for D2D signal transmission, according to the determined synchronization reference for sending or receiving the other D2D signal, and the determined D2D resource configuration, and sending or receiving the other D2D signal at the resource position;

wherein sending or receiving the D2D signal at the resource position comprises:

determining the resource position for sending and/or receiving the D2D signal, according to the synchronization reference determined based upon the synchronization signal, and the D2D resource configuration determined according to the information carried in the synchronization signal, and sending or receiving the D2D signal at the resource position; or determining the resource position for sending and/or receiving the D2D signal, according to the synchronization reference determined based upon the discovery sequence in the D2D discovery signal, and the D2D resource configuration determined according to the information carried in the D2D discovery signal, and sending or receiving the D2D signal; or determining the resource position for sending and/or receiving the D2D signal, according to the synchronization reference determined based upon the communication synchronization sequence in the D2D communication signal, and the D2D resource configuration determined according to the information carried in the D2D communication signal, and sending or receiving the D2D signal; or determining the resource position for sending and/or receiving the D2D signal, according to the synchronization reference determined based upon the synchronization signal, and the D2D resource configuration determined according to the information carried in the D2D discovery signal and/or the information carried in the D2D communication signal, and sending or receiving the D2D signal; or determining the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and sending or receiving the D2D signal; or determining the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and sending or receiving the D2D signal.

2. The transmitting method according to claim 1, wherein the synchronization reference comprises at least one of:

a timing synchronization reference, a frequency synchronization reference.

3. The transmitting method according to claim 2, wherein determining the synchronization reference for sending or receiving the other D2D signal comprises at least one of:
   obtaining a sub-frame start position according to a discovery sequence in the D2D discovery signal, or a communication synchronization sequence in the D2D communication signal;
   obtaining a frequency offset estimation according to a discovery sequence in the D2D discovery signal, or a communication synchronization sequence in the D2D communication signal;
   obtaining a sub-frame number and/or a radio frame number according to information carried in a discovery message in the D2D discovery signal, or a communication message in the D2D communication signal;
   obtaining a sub-frame start position and a sub-frame number according to a synchronization sequence in the synchronization signal;
   obtaining a frequency offset estimation according to a synchronization sequence in the synchronization signal;
   obtaining a radio frame number according to information carried over a synchronization channel in the synchronization signal.

4. The transmitting method according to claim 1, wherein determining the D2D resource configuration according to the information carried in the detected synchronization signal and/or D2D signal comprises:
   determining the D2D resource configuration according to the information carried in the synchronization signal and/or the D2D signal, and a pre-obtained correspondence relationship between the information and the D2D resource configuration; or
   determining a physical resource for D2D transmission according to the information carried in the synchronization signal, and determining the D2D resource configuration according to the physical resource; or
   determining the D2D resource configuration directly according to D2D resource configuration information comprised in the detected D2D signal.

5. The transmitting method according to claim 4, wherein the information carried in the synchronization signal comprises at least one of:
   a sequence identifier for generating a synchronization sequence in the synchronization signal, a sequence type for the synchronization sequence, a cyclic shift for the synchronization sequence, Time Division Duplex, TDD, uplink-downlink configuration information carried in the synchronization signal, system bandwidth information carried in the synchronization signal.

6. The transmitting method according to claim 1, wherein determining the D2D resource configuration comprises:
   determining a D2D resource configuration of a UE sending the synchronization signal and/or the D2D signal; or
   determining a global D2D resource configuration.

7. The transmitting method according to claim 1, wherein the D2D signal comprises at least one of:
   a D2D discovery signal, a D2D communication signal.

8. The transmitting method according to claim 1, wherein the D2D resource configuration comprises at least one of:
   a D2D discovery resource configuration, a D2D communication resource configuration.

9. The transmitting method according to claim 1, wherein the D2D resource configuration comprises at least one of:
   a physical resource configuration, a physical resource unit, the number of transmissions in a periodicity, the probability at which the D2D signal is sent, information about a sequence used by the D2D signal, scrambling information for the D2D signal, the length of a CP of the D2D signal.

10. An apparatus for transmitting a D2D signal, the apparatus comprising:
   a first determining module configured to detect a synchronization signal and/or a D2D signal, and to determine a synchronization reference for sending or receiving other D2D signal according to the synchronization signal and/or the D2D signal;
   a second determining module configured to determine a D2D resource configuration according to information carried in the detected synchronization signal and/or D2D signal; and
   a transmitting module configured to determine a resource position for D2D signal transmission, according to the determined synchronization reference for sending or receiving the other D2D signal, and the determined D2D resource configuration, and to send or receive the other D2D signal at the resource position;
   wherein the transmitting module configured to send or receive the D2D signal at the resource position is configured:
   to determine the resource position for sending and/or receiving the D2D signal, according to the synchronization reference determined based upon the synchronization signal, and the D2D resource configuration determined according to the information carried in the synchronization signal, and to send or receive the D2D signal at the resource position; or
   to determine the resource position for sending and/or receiving the D2D signal, according to the synchronization reference determined based upon the discovery sequence in the D2D discovery signal, and the D2D resource configuration determined according to the information carried in the D2D discovery signal, and to send or receive the D2D signal; or
   to determine the resource position for sending and/or receiving the D2D signal, according to the synchronization reference determined based upon the communication synchronization sequence in the D2D communication signal, and the D2D resource configuration determined according to the information carried in the D2D communication signal, and to send or receive the D2D signal; or
   to determine the resource position for sending and/or receiving the D2D signal, according to the synchronization reference determined based upon the synchronization signal, and the D2D resource configuration determined according to the information carried in the D2D discovery signal and/or the information carried in the D2D communication signal, and to send or receive the D2D signal; or
   to determine the resource position for sending and/or receiving the D2D signal, according to the synchronization reference determined based upon the discovery sequence in the D2D discovery signal and the synchronization signal, and the D2D resource configuration determined according to the information carried in the synchronization signal or the D2D discovery signal, and to send or receive the D2D signal; or
   to determine the resource position for sending and/or receiving the D2D signal, according to the synchronization reference determined based upon the communication synchronization sequence in the D2D communication signal and the synchronization signal, and the D2D resource configuration determined according to the information carried in the synchronization signal or the D2D communication signal, and to send or receive the D2D signal.

11. The transmitting apparatus according to claim 10, wherein the synchronization reference comprises one of:
a timing synchronization reference and a frequency synchronization reference.

12. The transmitting apparatus according to claim 11, wherein the first determining module is configured to determine the synchronization reference for sending or receiving the other D2D signal by at least one of:
obtaining a sub-frame start position according to a discovery sequence in the D2D discovery signal, or a communication synchronization sequence in the D2D communication signal;
obtaining a frequency offset estimation according to a discovery sequence in the D2D discovery signal, or a communication synchronization sequence in the D2D communication signal;
obtaining a sub-frame number and/or a radio frame number according to information carried in a discovery message in the D2D discovery signal, or a communication message in the D2D communication signal;
obtaining a sub-frame start position and a sub-frame number according to a synchronization sequence in the synchronization signal;
obtaining a frequency offset estimation according to a synchronization sequence in the synchronization signal;
obtaining a radio frame number according to information carried over a synchronization channel in the synchronization signal.

13. The transmitting apparatus according to claim 10, wherein the second determining module configured to determine the D2D resource configuration is configured to determine the D2D resource configuration according to the information carried in the synchronization signal and/or the D2D signal, and a pre-obtained correspondence relationship between the information and the D2D resource configuration; or
to determine a physical resource for D2D transmission according to the information carried in the synchronization signal, and to determine the D2D resource configuration according to the physical resource; or
to determine the D2D resource configuration directly according to D2D resource configuration information comprised in the detected D2D signal.

14. The transmitting apparatus according to claim 13, wherein the information carried in the synchronization signal comprises at least one of:
a sequence identifier for generating a synchronization sequence in the synchronization signal, a sequence type for the synchronization sequence, a cyclic shift for the synchronization sequence, Time Division Duplex, TDD, uplink-downlink configuration information carried in the synchronization signal, system bandwidth information carried in the synchronization signal.

15. The transmitting apparatus according to claim 10, wherein the second determining module configured to determine the D2D resource configuration is configured to determine a D2D resource configuration of a UE sending the synchronization signal and/or the D2D signal; or
to determine a global D2D resource configuration.

16. The transmitting apparatus according to claim 10, wherein the D2D signal comprises at least one of:
a D2D discovery signal, a D2D communication signal.

17. The transmitting apparatus according to claim 10, wherein the D2D resource configuration comprises at least one of:
a D2D discovery resource configuration, a D2D communication resource configuration.

18. The transmitting apparatus according to claim 10, wherein the D2D resource configuration comprises at least one of:
a physical resource configuration, a physical resource unit, the number of transmissions in a periodicity, the probability at which the D2D signal is sent, information about a sequence used by the D2D signal, scrambling information for the D2D signal, the length of a CP of the D2D signal.

* * * * *